Oct. 17, 1950     D. L. MOUNT     2,525,822
POWER TRANSMISSION
Filed Oct. 31, 1946     8 Sheets-Sheet 3
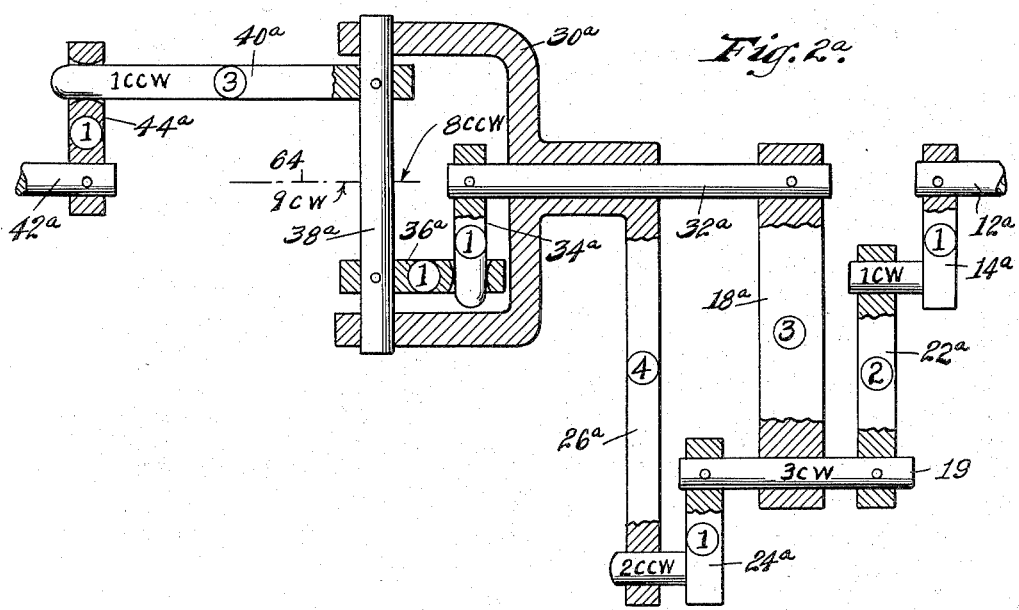
Fig. 2ª
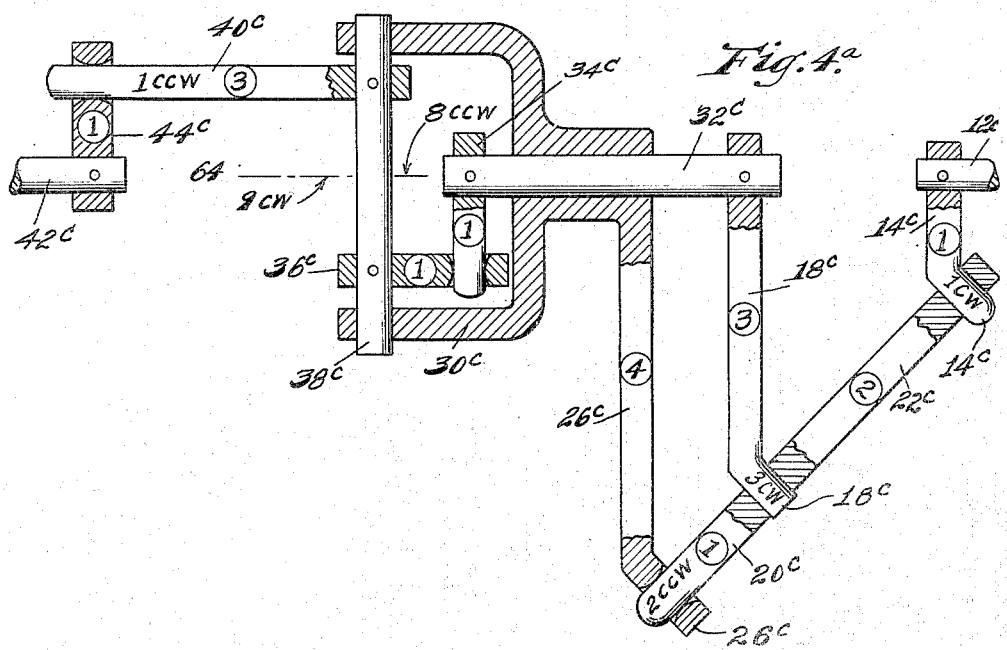
Fig. 4ª
Inventor.
Donald L. Mount.
By Bair & Freeman
Att'ys.

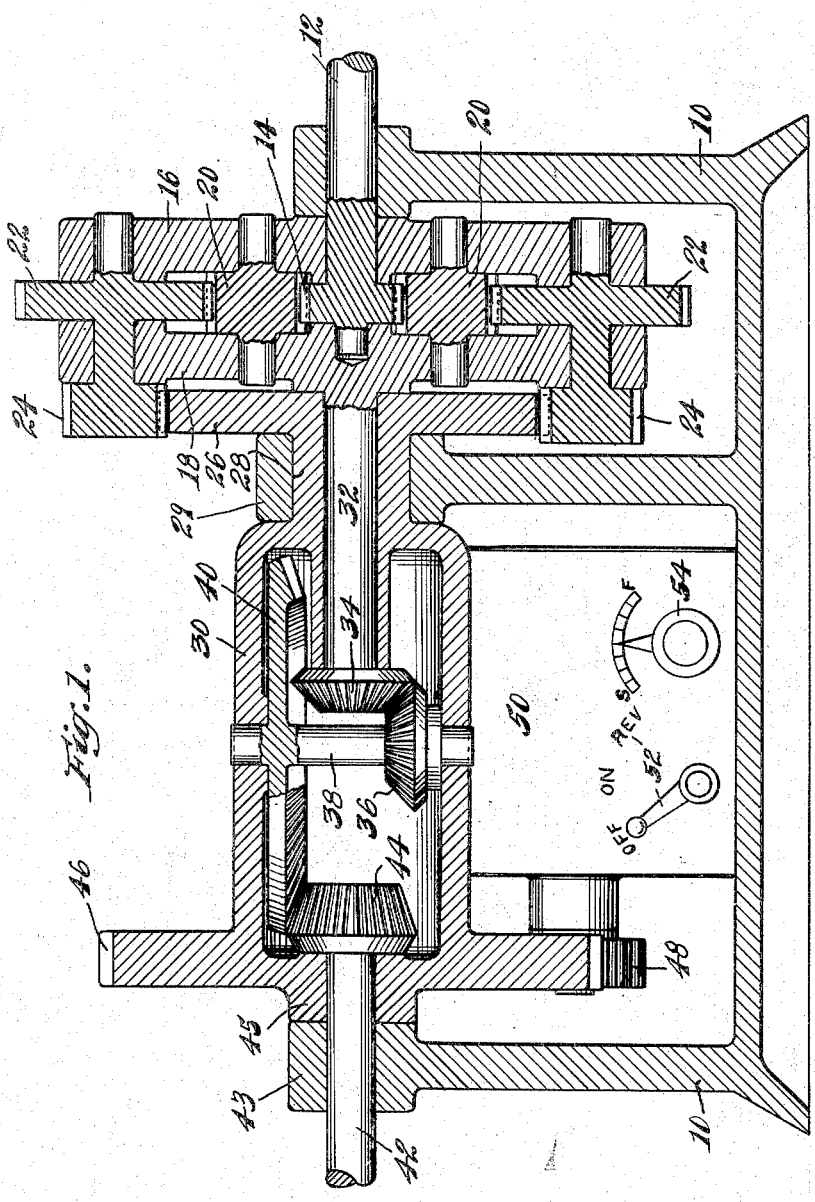

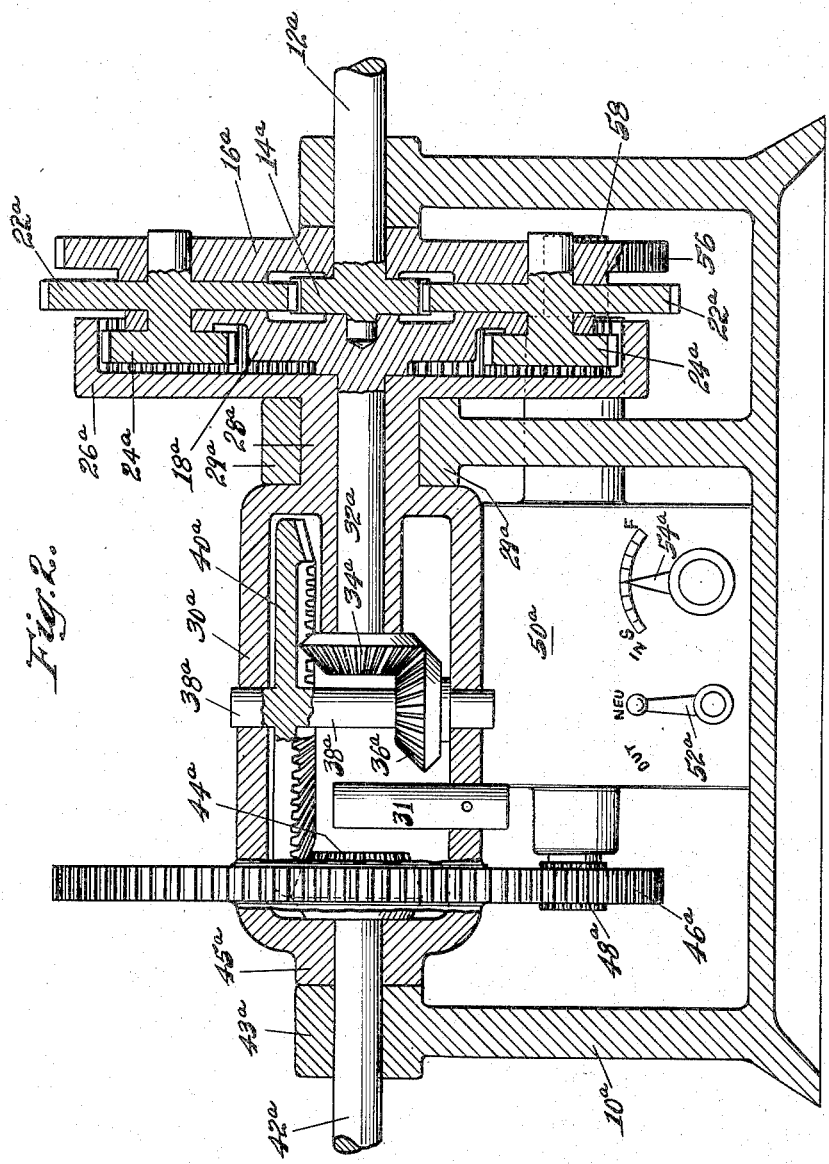

Oct. 17, 1950  D. L. MOUNT  2,525,822
POWER TRANSMISSION
Filed Oct. 31, 1946  8 Sheets-Sheet 4
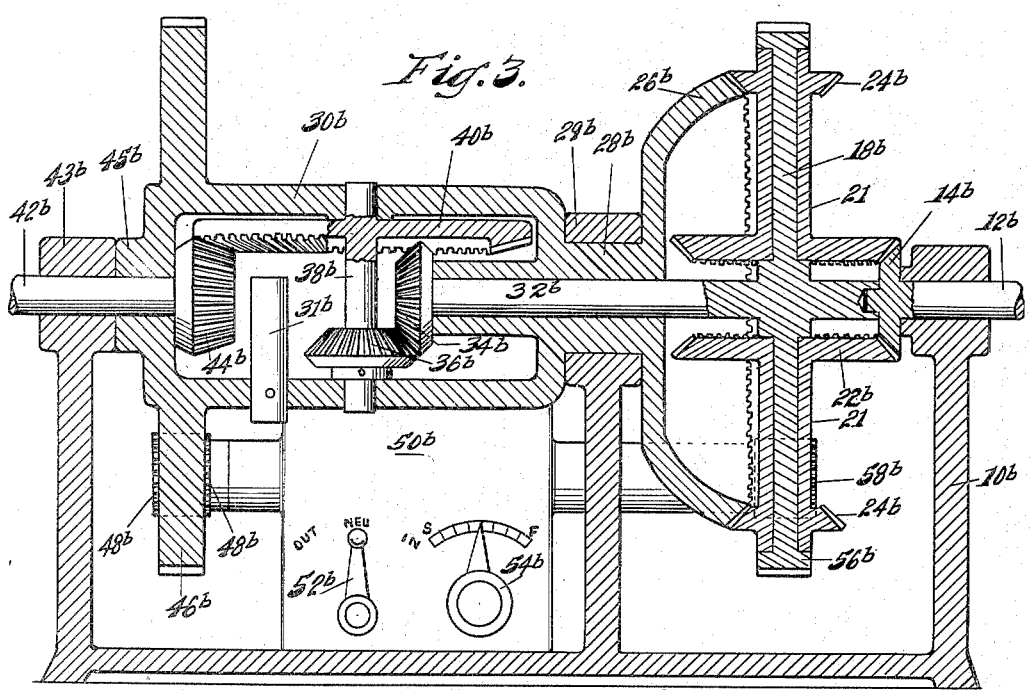
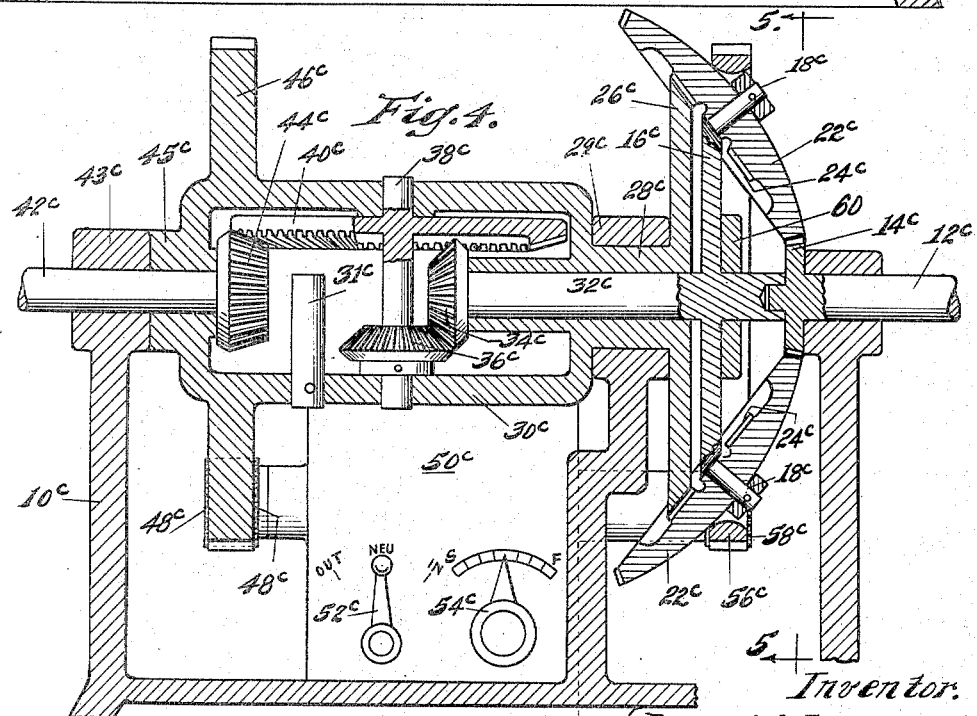
Inventor:
Donald L. Mount.
By Bair & Freeman
Attys.

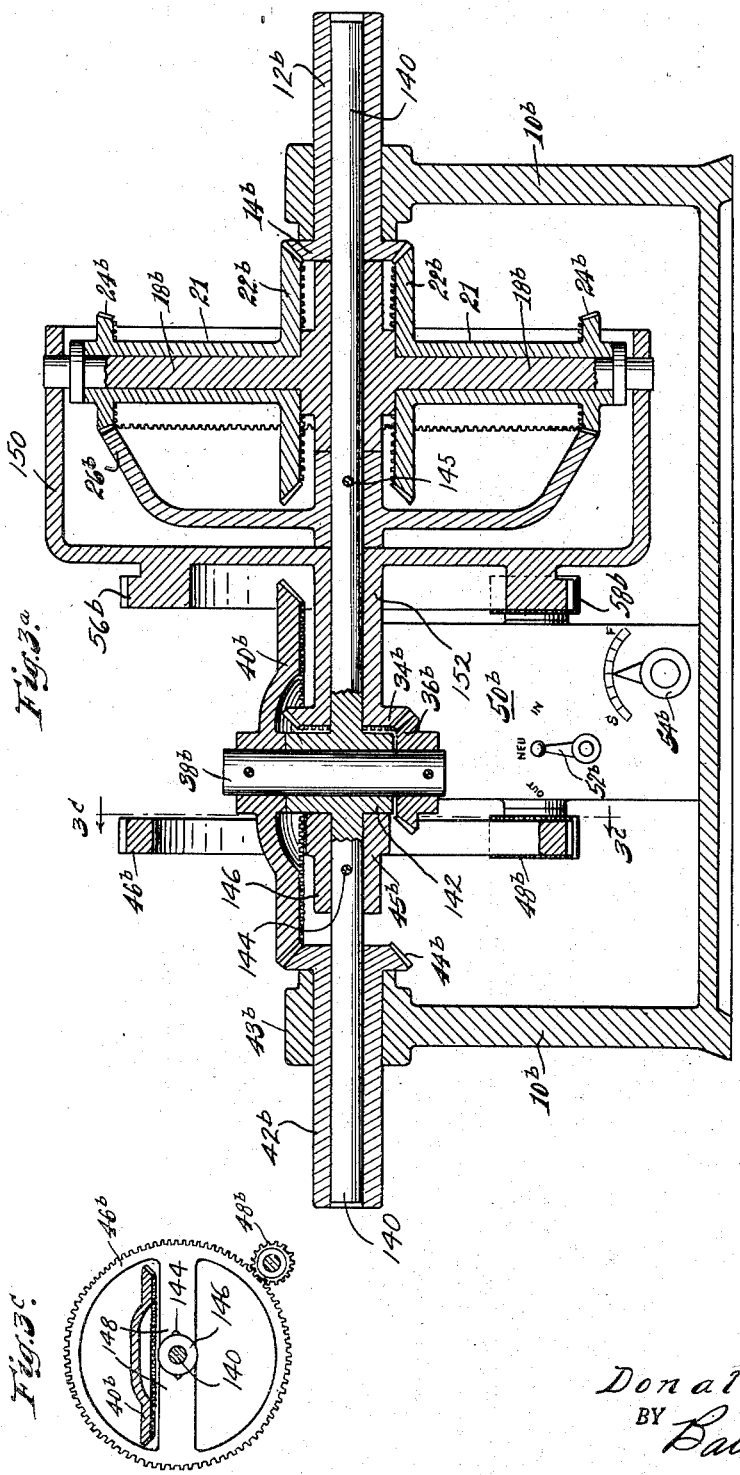

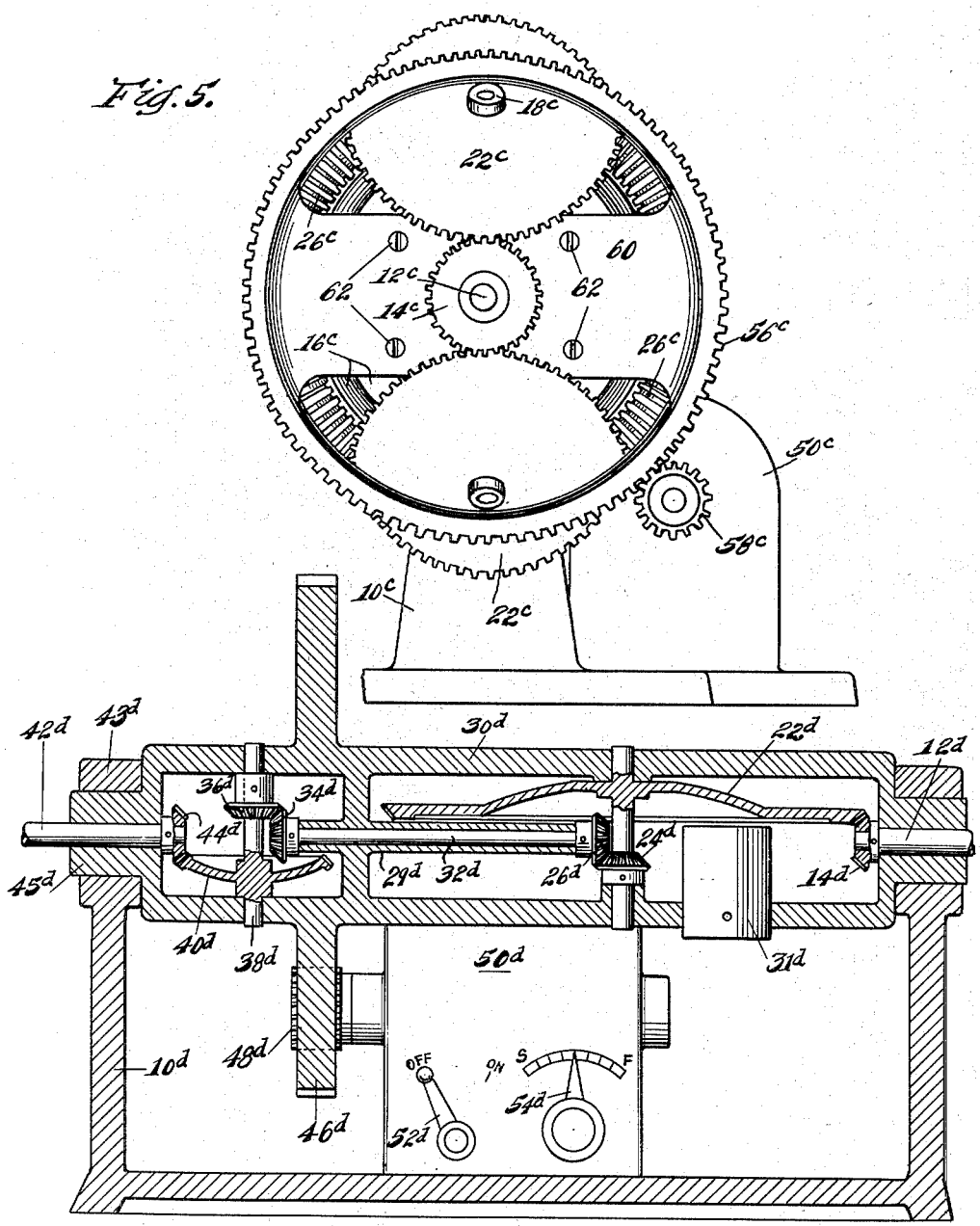

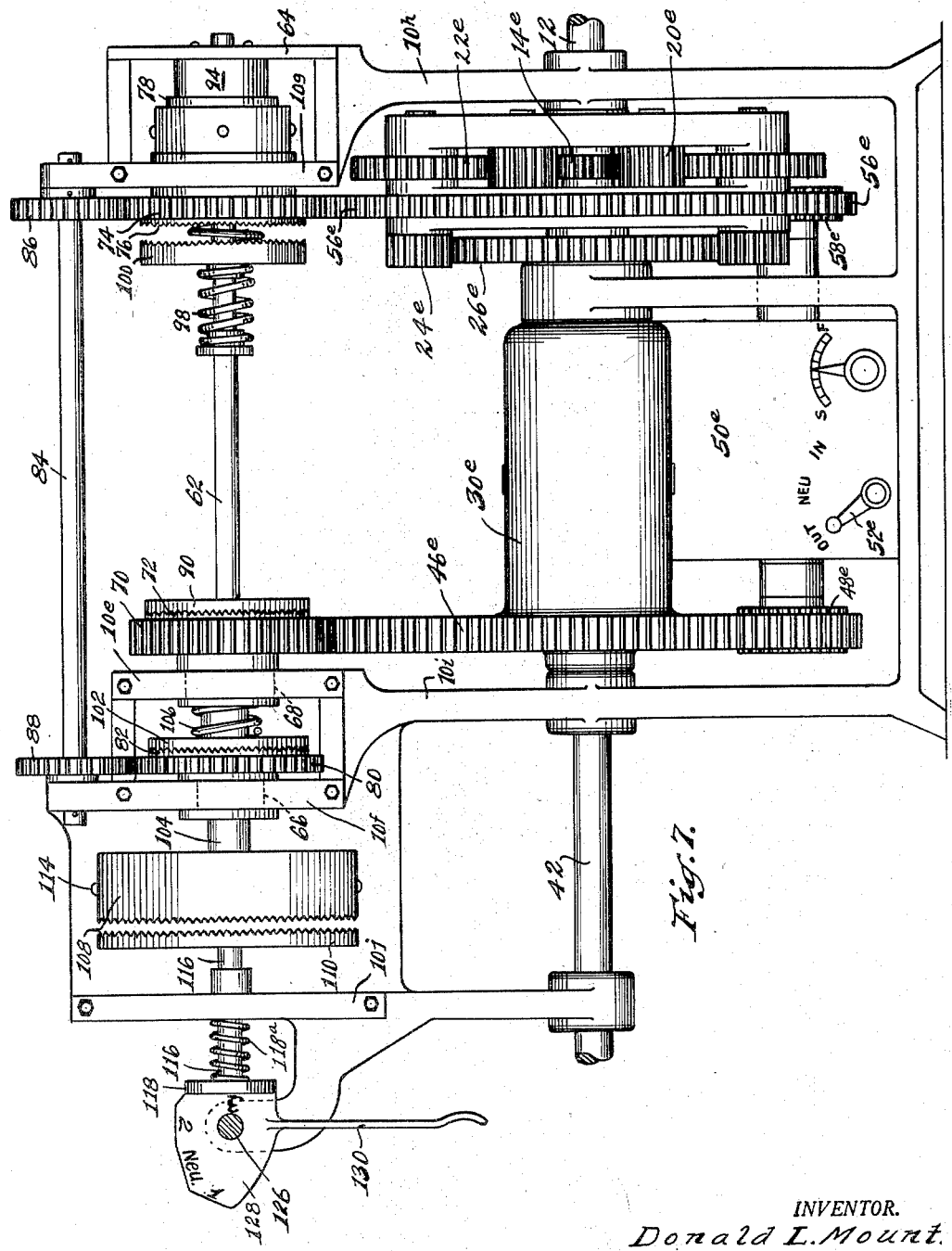

Oct. 17, 1950  D. L. MOUNT  2,525,822
POWER TRANSMISSION
Filed Oct. 31, 1946  8 Sheets-Sheet 8
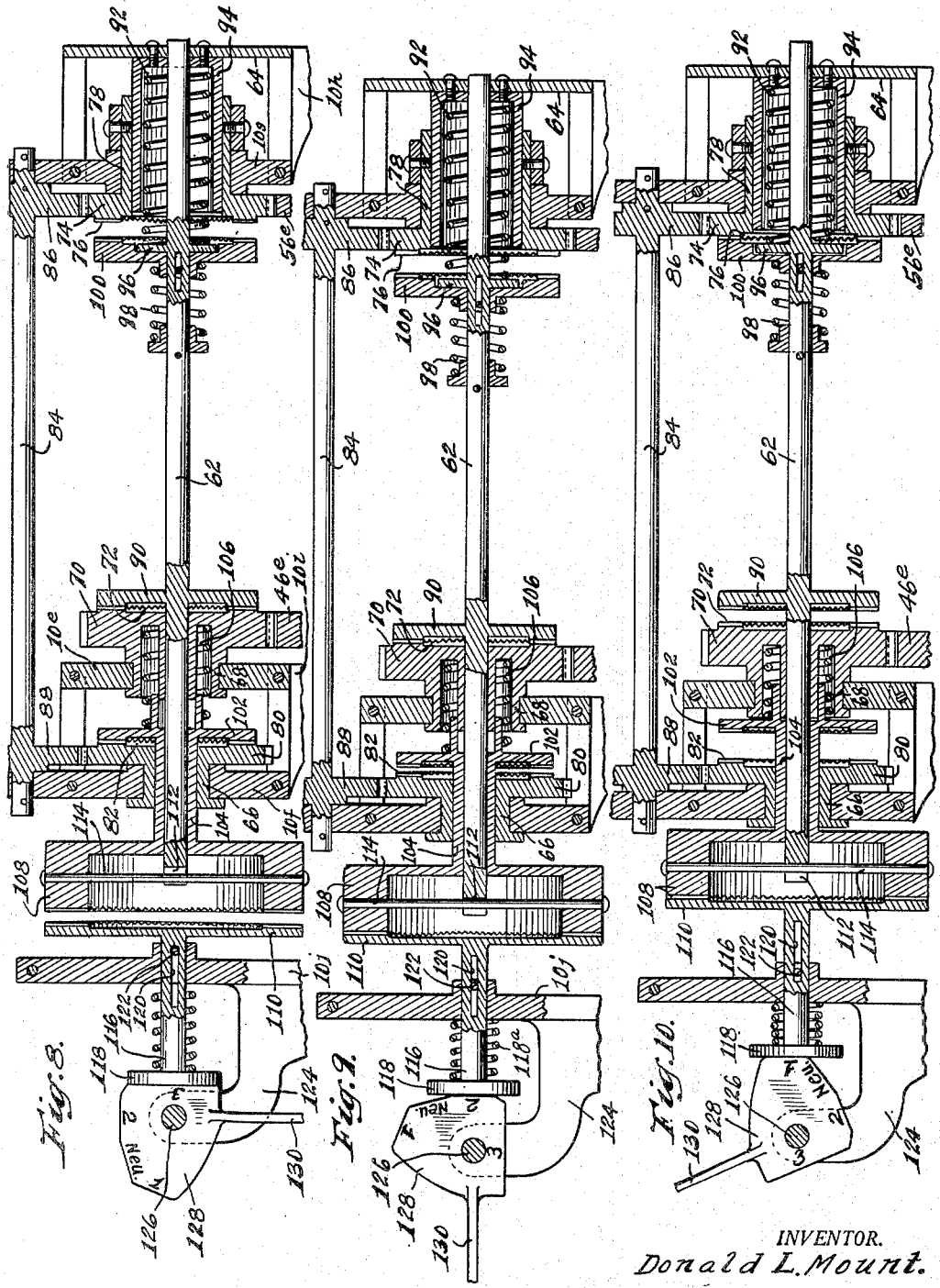
INVENTOR.
Donald L. Mount.
BY Bair & Freeman
Attys.

Patented Oct. 17, 1950

2,525,822

UNITED STATES PATENT OFFICE 2,525,822

POWER TRANSMISSION

Donald L. Mount, Memphis, Mo.

Application October 31, 1946, Serial No. 707,007

23 Claims. (Cl. 74—675)

My present invention relates to a power transmission wherein positive drive, variable speed output is secured.

One object of the invention is to provide a pair of gear trains interposed between an input shaft and an output shaft, at least one of the gear trains including a frame which may rotate with both gear trains and at their speed to effect simultaneous rotation of the output shaft at the same speed as the input shaft, or the frame may be rotated at lesser speed to decrease the speed of the output shaft relative to the speed of the input shaft.

Another object of the invention is to provide a simple gearing arrangement for effecting the desired results and a means to vary the speed of the output shaft relative to the input shaft by means of an adjustable speed drive connected with either one of two frames for driving it at a speed equal to or below the speed of the input shaft, each of the two frames being a part of one of the gear trains.

Still another object is to provide a gearing arrangement including two gear trains which have an equilibrium relationship to each other, a frame or housing when controlled as to one speed of rotation, rotating with the input shaft and thereby effecting rotation of the output shaft at the same speed as the input shaft and when controlled as to other speeds of rotation effecting rotation of the output shaft at a reduced speed.

A further object is to provide means for rotating the frame at a speed other than the input shaft, thereby effecting a change in the output speed with relation to the input speed of my transmission, the balanced condition of the two gear trains being such that very little power is needed for rotating the frame either equal to or slower than the input shaft.

Still a further object is to provide a double gear train arrangement in which the two trains are balanced in relation to each other, the gear trains being capable of arrangement in a variety of ways involving bevel and/or spur gears so long as certain leverage relationships are maintained.

With these and other objects in view, my invention consists in the construction, arrangement and combination of the various parts of my power transmission and in various gearing arrangements to accomplish the balanced condition between the two gear trains whereby the objects contemplated are attained as hereinafter more fully set forth, pointed out in my claims and illustrated in the accompanying drawings wherein:

Figure 1 is a sectional view of a transmission embodying my invention showing a combination of spur and bevel gears and including an adjustable speed drive for a gear housing of the transmission.

Figure 2 is a similar sectional view using an internal gear at one point in place of an external gear as shown in Figure 1, and showing an adjustable speed drive operable to selectively connect with an input end frame or an output end frame of the transmission, or to assume a neutral position permitting free rotation of the frame of the transmission in the event some other gearing provision is made such as that shown in Figures 7 to 10.

Figure 2a is a force diagram wherein the gears of Figure 2 are represented as levers to aid in an explanation of the balance of forces involved.

Figure 3 is a sectional view showing a modified form of transmission in which bevel gears are substituted for the spur gears at the input ends of the transmissions of Figures 1 and 2.

Figure 3a is a sectional view showing a modified form of transmission similar to Figure 3 but with a special through shaft substituted in place of three aligned shafts in Figure 3.

Figure 3b is a side elevation partly in section of the special through shaft.

Figure 3c is a vertical sectional view on the line 3c—3c of Figure 3a showing the parts on a reduced scale.

Figure 4 is a sectional view showing another modification with a different arrangement of bevel gears at the input end of the transmission.

Figure 4a is a similar force diagram for Figure 4.

Figure 5 is a sectional view on the line 5—5 of Figure 4.

Figure 6 is a sectional view of still another modified form of construction using bevel gears throughout.

Figure 7 is a side elevation of my power transmission as shown in the previous figures with the addition of a three positional speed clutch.

Figure 8 is a sectional view through the clutch of Figure 7 showing it in high speed position, and Figures 9 and 10 are similar sectional views showing respectively intermediate and low speed positions.

On the accompanying drawings I have used the reference numeral 10 to indicate a frame for the various elements of my power transmission. A power input shaft 12 is journaled in the frame 10 and has a gear 14 which meshes with an idler gear 20.

A pair of planetary frame elements 16 and 18 are rotatably mounted with respect to the gear 14 and its shaft 12 and constitute a "first frame."

Idler gears 20 are journaled in the frame members 16 and 18 and mesh with gears 22 also journaled therein. Rotatable with the gears 22 are pinions 24 which mesh with a gear 26 on a sleeve 28. The gears and pinions 20, 22 and 24 are arranged in opposite pairs for balance and so that there is no vibration due to unbalance when the parts rotate at high speed.

I have shown gears and their shafts all in one piece for simplicity in the patent drawings although obviously the gears would in practice be formed separate from the shafts and pinned or keyed thereto. Suitable ball bearings are preferably used in place of the plain bearings shown, all of which is well understood in the power transmission art.

The sleeve 28 is journaled in a bearing 29 of the frame 10 and terminates in a planetary gear housing 30. The housing constitutes a "second frame." The frame 18 terminates in an intermediate shaft 32 journaled in the sleeve 28 and having secured thereon a bevel gear 34. The bevel gear 34 meshes with a bevel gear 36 secured to a cross shaft 38 and also secured to the cross shaft is a bevel gear 40.

A power output shaft 42 is journaled in a bearing 43 of the frame 10 and in a hub 45 of the housing 30. A bevel gear 44 is secured to the power output shaft 42 and meshes with the bevel gear 40.

The planetary housing 30 has gear teeth 46 thereon which may be in the form of a ring gear secured to the housing instead of an integral part of the housing as illustrated. An adjustable speed drive 50 is provided having a gear 48 meshing with the gear 46. The adjustable speed drive may be of any suitable character such as that shown in my copending application, Serial No. 544,895, filed July 14, 1944, now Patent No. 2,412,351, dated December 10, 1946.

The adjustable speed drive 50 preferably has a conventional clutch arrangement which may be controlled by a control lever 52 to "Off" position wherein the gear 48 is free-wheeling, "On" so that the gear 48 may be rotated by the adjustable speed drive in the direction of the input shaft, or "Rev" so that the gear 48 may be rotated in a direction opposite that of the input shaft. A suitable control knob 54 is provided for adjusting the gear 48 to a speed that is either slower or equal to the speed of the input shaft 12 as indicated by the indicia S for slow and F for fast. My copending application discloses mechanism for adjusting the speed of a drive of this character but since it forms no part of my present invention it is not shown in detail.

The modified form of my invention shown in Figure 2 has many of the parts of Figure 1 and they are accordingly given the same reference characters with the addition of the distinguishing characteristic "a." The gear 26a in this case is an internal gear instead of an external gear and the arrangement eliminates the necessity of the gear 20 in Figure 1, the gear 22a, and this shaft being journaled in the planetary frame members 16a and 18a.

In addition to the gear 48a on the adjustable speed drive 50a the planetary frame 16a—18a has gear teeth 56 thereon with which a pinion 58 meshes. The pinions 48a and 58 are selectively operable by means of the lever 52a which in Figure 2 has three positions as follows:

"Out"-pinion 48a clutched to adjustable speed drive, "In"-pinion 58 clutched to adjustable speed drive and "Neu"-neutral position where neither 48a nor 58 are clutched to the adjustable speed drive. In order to counter-balance the weight of planetary housing 30a against unbalance during rapid rotation a counter-weight 31 is provided and located to counter-balance the weight of the bevel gear 40a in excess of the weight of the bevel gear 36a.

Figure 3 differs from Figures 1 and 2 in substituting bevel gears for the spur gears, the bevel gears being shown at 14b, 22b, 24b, and 26b. The shaft 32b has a radial shaft 18b to take the place of the frame 16—18 of Figure 1. The bevel gears 22b and 24b are connected together by a sleeve 21 which rotates on the radial shaft 18b. As in Figure 2 the gearing arrangement in Figure 3 has a ring gear 56b with which a pinion 58b meshes and this pinion and the pinion 48b are selectively operable from the adjustable speed drive 50b as explained in connection with Figure 2.

In the form of invention shown in Figure 3a I have substituted a special through shaft 140 for the three aligned shafts 12b, 32b and 42b of Figure 3. This makes for better mechanical construction. In Figure 3a an input sleeve 12b is used instead of the input shaft 12b of Figure 3 and there is a similar sleeve 42b at the output end to correspond to the output shaft 42b in Figure 3.

Instead of journalling the shaft 38b in a housing 30b as in Figure 3 it is journaled in a cross boss 142 of the shaft 140. The ring gear 46b is then secured to the shaft 140 as by means of a pin 144 extending through a hub 146 connected to the ring gear 46b by a pair of spokes 148 as shown in Figure 3c. Thus the through shaft 140 effects a more accurate line-up of the gears and takes the place of the housing 30b as far as journalling the shaft 38b and mounting the ring gear 46b are concerned.

In Figure 3 the cross shafts 18b are connected with the bevel gear 34b by means of the shaft 32b. Comparable with this, Figure 3a provides a connection in the form of a housing 150 in which the ends of the cross shaft 18b are mounted and having a sleeve portion 152 connecting up with the gear 34b. The ring gear 56b in this modification of the invention is formed as part of the housing 150 or the parts 34b and 56b may be separate parts attached to the sleeve 152 and the housing 150 if desired. As far as operation is concerned there is no difference arising from the change in constructional details.

As in Figure 3 the adjustable speed drive 50b is used and geared by means of the gears 48b and 58b as in Figure 3 with the ring gears 46b and 56b. For the purpose of readability of some of my claims on this form of invention the journalling boss 142 and the ring gear 46b may be considered a "frame" equivalent to the frame or housing 30b of Figure 3.

In Figure 4 a bevel gear 14c on the input power shaft 12c meshes with bevel gears 22c which are journaled on studs 18c of a disc 16c secured to the shaft 32c. The bevel gears 22c have teeth 24c on a smaller radius than the teeth at their peripheries which teeth 24c mesh with a bevel gear 26c.

The adjustable speed drive connections are similar to those in Figure 3, the ring 56c being arranged to surround the bevel gears 22c and having a cross bar 60 secured to the disc 16c so that the ring gear rotates therewith. The peculiar construction for thus mounting the ring gear is best shown in Figure 5 wherein screws 62 are provided for connecting the cross bar to the disc 16c.

In Figure 6 a bevel gear 14d meshes with a bevel gear 22d journaled in the housing 30d. The bevel gear 22d drives the bevel pinion 24d which in turn drives the bevel pinion 26d on the shaft 32d. The remaining elements are the same as in previous figures and have been given the same reference numerals with the addition of "d." The gears 22d and 24d being journaled directly in the housing 30d eliminate the necessity of providing connections such as from the gear 26 to the housing and from the frame 16—18 to the shaft 32 as in Figure 1, Figure 6 reversing the order of connection and providing the gear 26d connected to the shaft 32d, and the frame in which the shaft for the gears 22d and 24d is journaled being part of the housing 30d.

In each disclosed modification the desired balance of forces between the two gear trains is had and the drawings are merely illustrative as to some of the ways in which my power transmission can be made up to secure the desired results. The lowest output speed is zero when the frame 30 is rotated in a reverse direction at one-half the speed of the input shaft 12. The mechanical advantage approaches infinity as the speed of the frame 30 in a reverse direction approaches half the speed of the input shaft. The closer to zero the speed of the output shaft, the closer the mechanical advantage comes to infinity.

In order to explain the operation of my power transmission I have resolved the gear systems into lever systems and made diagrammatic drawings in Figure 2a and Figure 4a corresponding to the gearing arrangements in Figures 2 and 4 respectively. These will now be explained and it is believed that the explanations will make obvious the application of the principles involved to all modifications in the drawings.

The gear system in Figure 2 may be considered as a lever 14a on the shaft 12a and similar levers on the other shafts with the lever 14a having a crank pin in an opening of the lever 22a and so on as shown diagrammatically in Figure 2a. Each lever has a length unit marked on it in a circle such as 14a—1 unit
22a—2 units
16a—3 units
26a—4 units and so on. By now applying power to rotate the shaft 12a, that power will represent effort on the crank pin of the lever 14a equal to the power times one unit which can be considered as one power unit. Assuming that the shaft 12a is being rotated clockwise we can place on the crank pin of the lever 14a the designation 1CW (1 power unit clockwise).

Since the lever 22a is two units long and lever 24a is one unit long the one unit clockwise power applied at the crank pin of the lever 14a will result in three power units clockwise on the shaft 19 for the levers 22a and 24a because the lower end of lever 26a considered as a fulcrum gives two levers (24a one unit long, and 24a plus 22a three units long). The 3CW on the shaft 19 indicates a tendency to rotate the lever 18a clockwise at the rate of 9CW power units because the 3CW is multiplied by 3 (the length of the lever 18a). Through the levers 34a and 36a the lever 18a tends to rotate the entire assembly of the elements 36a, 38a and 40a clockwise 9 power units about the axis 64. At the same time the leverage of 24a to 22a being 2 to 1 will result in 2CCW on the crank pin of the lever 24a which multiplied by 4 (the length of the lever 26a) will result in 8CCW for the frame 30a which of course is transmitted to the assembly 36a—38a—40a. Thus we have 8 power units counterclockwise and 9 power units clockwise applied to the assembly 36a—38a—40a about the axis 64 and the one power unit clockwise in excess of those counter-clockwise is opposed by one power unit of counterclockwise of resistance to torque (1CCW on the lever 40a) due to the load on the output shaft 42a.

The counter-clockwise power units therefore add up to 9 which is exactly the same as the clockwise power units so that the two gear trains (14a—22a—18a—34a—36a to 38a; and 14a—22a—24a—26a—30a to 38a) are balanced or in equilibrium. Under these conditions I have found that the output shaft will rotate at the same speed as the input shaft when the frame 30a is rotated at the same speed as the input shaft. The frame itself will also rotate at the same speed as the input and output shafts.

Whenever either the first frame 18a or the second frame 30a is slowed down or reversed as by means of an adjustable speed drive as disclosed, the output shaft will be slowed down relative to the input shaft and due to the balance of forces in the two gear trains it takes but very little power from the adjustable speed drive to accomplish the desired results in spite of heavy power transmission from the input shaft to the output shaft. The slow-down is to zero when the frame 30a is rotated in a reverse direction at one-half the speed of the input shaft, the mechanical advantage at this time approaching infinity. My arrangement provides a positive gear drive with a means to vary the relative speeds of the output and input shafts in an infinite number of steps.

Comparing Figure 4a with Figure 2a the leverages and units clockwise and counterclockwise are given. Their result is the same balance of forces, that is, one gear train exerts 9 units of force clockwise while the other gear train exerts 8 units counter-clockwise to which may be added the one unit counter-clockwise in the form of resistance to turning offered by the output shaft so that the forces are balanced.

The gear 22c of Figure 4 is shown as a lever 22c in Figure 4a having a lower arm 1 unit long and an upper arm 2 units long so that the leverage from 26c to 18c is three times as great as from 26c to 14c. This gives 3CW for the lever 18c when 1CW is applied on the crank pin of 14c the same as in Figure 2a.

In the foregoing specification I have attempted to show, particularly in connection with Figures 2a and 4a, the principles involved in my power transmission. The pitch diameters of the gears of the transmission are such as to correspond to the leverage units designated in Figures 2a and 4a so that continuous rotation at the various leverage valves results from operation of the gearing. The principle of operation as far as I am able to discover is in accordance with the foregoing description whereas in actual practice the gearing operates in the manner described, that is, with the frame 30 free to rotate and rotated at input speed 12, direct drive without frictional losses in the gears is had or lower speeds can be secured for the output shaft by applying rotational force to either the frame 16—18 or the frame 30 to cause it to rotate slower than the input shaft and by reversing either of the frames (rotating them counter-clockwise or in a direction opposite that of the input shaft), the mechanical advantage is increased.

The several embodiments of the invention operate in substantially the same manner and produce the same results when the leverage proportions disclosed are maintained for the various elements of the gear trains. Many other gear ratios embodying the principles herein described may be used successfully to obtain similar results.

Since it takes but very little input of power from the adjustable speed drive 50 to the ring gear 46 to produce rotation of the frame 30 in either direction even though considerable power is being transmitted from the shaft 12 to the shaft 42, the drive 50 may be in the form of a relatively small and inexpensive motor or hydraulically driven unit which acts as a pilot for changing the speed of the shaft 42 relative to the speed of the shaft 12. The adjustable speed drive takes advantage of the substantially equal and opposed forces exerted on the final gear unit 36—38—40 from the trains of gears and yet there is but small loss of power transmitted through the device. In speaking of Figure 1, the foregoing remarks apply also to the remaining figures of the drawing.

As to the various gearing arrangements disclosed, it will be noted that they are planetary in character, those for the input shaft 12 including a planetary frame element 16—18 which drives one of the gear trains for the output shaft, whereas one of the gears for the input shaft is connected directly to the planetary housing or frame 30. This seems to be an essential characteristic of the gearing arrangement of my power transmission, except as previously noted in connection with Figure 6 and the explanation thereof.

My power transmission may be provided with a three-positional speed clutch as shown in Figures 7, 8, 9 and 10 that can be used in case the variable drive 50 breaks down, or the three-positional speed clutch can be substituted for the drive 50. The three-positional speed clutch comprises a shaft 62 journaled in a bearing plate 64 and in sleeves 66 and 68 which in turn are journaled in portions of the main frame 10 indicated at 10e and 10f, respectively. The bearing plate 64 is connected to a frame 10g which is supported by a frame portion 10h while the frame portions 10e and 10f are supported by a frame portion 10i. The transmission gearing arrangement in Figure 7 is substantially the same as in Figure 1 and bears similar reference numerals with the addition of e to each corresponding part. Figure 1 does not disclose a ring gear for the frame 16—18 whereas Figure 2 shows a ring gear 56. In Figure 7 a similar ring gear is shown at 56e.

Meshing with the ring gear 46e is a gear 70 formed on the sleeve 68. The gear 70 is provided with a serrated clutch face 72. The ring gear 56e meshes with a gear 74 having a serrated clutch face 76. The gear 74 is part of a sleeve 78 which is journaled in the frame portion 10g.

The sleeve 66 carries a gear 80 which is provided with a serrated clutch face 82. A countershaft 84 is journaled in the frame portions 10f and 10g and carries gears 86 and 88 meshing with the gears 74 and 80, respectively.

Normally meshing with the clutch teeth 72 is a clutch disc 90 secured to the shaft 62, the means for causing normal mesh being a spring 92 located in a sleeve 94 which is secured to the bearing plate 64 and on which the sleeve 78 rotates. The spring 92 bears against a flange 96 of the shaft 62.

Held against the flange 96 by a spring 98 is a clutch disc 100 having a serrated face for co-action at times with the serrations 76.

A clutch disc 102 is slidable on the shaft 62 and is part of a sleeve 104 slidable and rotatable in the sleeve 66. The clutch disc 102 is normally engaged with the serrations 82 of the gear 80 by a spring 106. The sleeve 104 terminates in a brake ring 108 opposing a non-rotating brake disc 110. A slidable but non-rotatable connection is provided between the shaft 62 and the brake ring 108 comprising a slot 112 in the shaft and a cross pin 114 carried by the ring.

The brake disc 110 is mounted on a shaft 116 which terminates in a shifting disc 118. The shaft 116 is slidable in a frame portion 10j and is prevented from rotation by means of a slot and pin connection 120—122. The frame portion 10j has an extension 124 carrying a pin 126 on which a shifter cam 128 is oscillatable. The cam 128 carries an adjusting lever 130 and is provided with three faces numbered 1, 2 and 3.

The three-positional speed clutch disclosed may be used when the lever 52e of the adjustable speed drive 50e is set at neutral ("Neu"). In the position of Figure 8, third speed or high speed is had with the ratio between input and output equaling one to one. It will be noted that the springs 92 and 106 are engaging the clutches 72—90 and 82—102. The gear 46e is driving the shaft 62 through the gear 70 and the teeth 72 of the clutch disc 90. The shaft 62 drives the brake ring 108 which through the sleeve 104 drives the clutch disc 102. Its teeth are in engagement with the teeth 82 of the gear 80 which gear drives the counter-shaft 84 which in turn is geared by the gears 86 and 74 to the gear 56e. Through the drive just described, the gears 46e and 56e are driven at the same speed and in the same direction thus giving a speed ratio of one to one for the output shaft in relation to the input shaft.

For intermediate or second speed the lever 130 is adjusted to the position shown in Figure 9 which causes the non-rotating disc 110 to engage the brake ring 108 and slide the sleeve 104 toward the right for disengaging the disc 102 from the gear 80 against the tension of the spring 106 and a spring 118a between the frame element 10j and the shifting disc 118. The shaft 62 is not moved longitudinally during the adjustment to second speed.

The speed ratio is now three to one as the gear 70 is held against rotation by the stationary disc 110, and the gear 46e as well as the housing 30e are likewise held stationary so that the gearing 14e, 20e, 22e, 24e, 26e and the gearing in the housing 30e (the same as in Figure 1) produces the step-down speed ratio between the input shaft 12 and the output shaft 42. At this time the gear 56e runs free because in driving the gears 74, 86, 88 and 80 it is unconnected with the clutch disc 102 in Figure 9 due to this disc now being spaced from the teeth 82 of the gear 80.

A low speed of four to one can be had by adjusting the lever 130 to the position of Figure 10. This results in the disc 90 being separated from the gear 70 and the disc 100 clutching with the gear 74 so that the shaft 62 held stationary by the disc 110 will result in the gear 74 and therefore the gear 56e being held stationary. At the same time the gear 70 is free to rotate as it is no longer clutched to the shaft 62. The spring 92 tends to keep the shaft 62 toward the left and when it is moved all the way to the right as in Figure 10, the spring 98 effects a resilient engagement of the teeth of the disc 100 with the teeth 76 of the gear 74. The clutch disc 100, it will be noted, has a pin and slot connection with the shaft 62 in a manner similar to the connection between the frame 107 and the shaft 118 at the left side of the figure.

When the adjustable speed drive 50e is in operation the three-positional speed clutch must be in a free-wheeling or neutral position. This position is not shown on the drawings but the cam 128, it will be noted, has a neutral position (Neu.) between the 1 and 2 positions. In the neutral position the disc 118 is pressed slightly further to the right in Figure 9 for disengaging the disc 99 relative to the gear 70 so that in this position all three discs 102, 99 and 100 are disengaged. This permits the necessary free wheeling so that the three-positional speed clutch does not interfere with the operation of the adjustable speed drive 50e.

I have disclosed gear arrangements which I have found satisfactory and others may be provided which will accomplish the same results in various combinations of spur and bevel gears. Different gearing arrangements and other changes as well may be made without departing from the real spirit and purpose of this invention. Accordingly it is my intention that my claims cover such modified forms of structure or use of mechanical equivalents as may be reasonably included within their scope.

I claim as my invention:

1. In a power transmission of the character disclosed, an input shaft, an output shaft, a main frame for journalling said shafts, input and output trains of gears, an input frame, an output frame, and an intermediate shaft, said gears, frames and intermediate shaft operatively connecting the respective input and output shafts together, said input train comprising a gear on the input shaft, a second gear journalled in the input frame and meshing with said first gear and a third gear rotating with said second gear, a fourth gear meshing with said third gear and carried by said output frame, said output train comprising a fifth gear secured to said intermediate shaft, a sixth gear meshing therewith and journalled in said output frame, a seventh gear rotatable with said sixth gear and an eighth gear on said output shaft and meshing with said seventh gear, and an adjustable speed drive for driving either of said input and output frames and thereby changing the speed of the output shaft relative to the speed of the input shaft.

2. In a power transmission of the character disclosed, an input shaft, an output shaft, a main frame for journalling said shafts, input and output trains of gears, a secondary input frame, a secondary output frame, and an intermediate shaft, said gears, frames and intermediate shaft operatively connecting the respective input and output shafts together, said input train comprising a gear on the input shaft, a second gear journalled in the secondary input frame and meshing with said first gear and a third gear rotating with said second gear, a fourth gear meshing with said third gear and carried by said secondary output frame, said output train comprising a fifth gear secured to said intermediate shaft, a sixth gear meshing therewith and journalled in said secondary output frame, a seventh gear rotatable with said sixth gear and an eighth gear on said output shaft and meshing with said seventh gear, and means for rotating one of said secondary frames.

3. In a positive drive variable speed power transmission, an input shaft, an output shaft, a main frame in which said shafts are journalled, an intermediate shaft, a first frame rotatable with respect to said input shaft, a second frame rotatable with respect to said output shaft, gears journalled in said first frame, said input and intermediate shafts having gears meshing therewith, said second frame also having a gear meshing therewith, a cross shaft journalled in said second frame and having gears, said intermediate and output shafts having gears meshing with said gears of said cross shaft, and means for rotating said second frame at the speed of said input shaft, said last means being adjustable to decrease the speed of said second frame relative to said input shaft.

4. In a positive drive variable speed power transmission, an input shaft, an output shaft, a main frame in which said shafts are journalled, an intermediate shaft, a first frame rotatable with respect to said input shaft, a second frame rotatable with respect to said output shaft, gears journalled in said first frame, said input and intermediate shafts having gears meshing therewith, said second frame also having a gear meshing therewith, a cross shaft journalled in said second frame and having gears, said intermediate and output shafts having gears meshing with said gears of said cross shaft, and means for rotating one of said input and output frames at the speed of said input shaft or at a speed decreased in relation thereto.

5. In a positive drive variable speed power transmission, an input shaft, an output shaft, a main frame journalling said shafts, an intermediate shaft, a first frame rotatable with respect to said main frame and with said intermediate shaft, a second frame rotatable on said output shaft, gears rotatably carried by said first frame, said second frame and said input shaft having gears meshing with the gears carried by said first frame, a cross shaft journalled in said second frame and provided with gears, said intermediate shaft and said output shaft having gears meshing with the gears of said cross shaft, and means for rotating one of said frames at the speed of said input shaft, said last means being adjustable to decrease the speed of said frame relative to said input shaft.

6. In a positive drive variable speed power transmission, an input shaft, an output shaft, a main frame journalling said shafts, an intermediate shaft, a first frame rotatable with respect to said main frame, a second frame rotatable on said output shaft, gears carried by said first frame, said second frame and said input shaft having gears meshing with the gears carried by said first frame, said first frame being carried by said intermediate shaft, a cross shaft journalled in said second frame and provided with gears, gears on said intermediate shaft and said output shaft meshing with the gears of said cross shaft, and means for controlling the rotation of at least one of said input and output frames.

7. In a positive drive power transmission, an input shaft, an output shaft and an intermediate shaft all aligned with each other, a main frame journalling said input and output shafts, and connections between said shafts comprising a frame rotatable with respect to said input shaft and secured to said intermediate shaft, a second frame rotatable with respect to said output shaft, a gear on said input shaft, gears journalled in said first frame and meshing with said gear of said input shaft, a gear carried by said second frame and meshing with said gears journalled in said first frame, gears carried by said intermediate and output shafts, a cross shaft journalled in said second frame, gears carried by said cross shaft and meshing with the gears of said intermediate and output shafts, and means for rotating at least one of said input and output frames.

8. In a positive drive power transmission, an input shaft, an output shaft and an intermediate shaft all aligned with each other, a main frame journalling said input and output shafts, and connections between said shafts comprising a frame rotatable with respect to said input shaft and secured to said intermediate shaft, a second frame rotatable with respect to said output shaft and rotatable relative to said output shaft, a gear on said input shaft, gears journalled in said first frame and meshing with said gear of said input shaft, a gear carried by said second frame and meshing with said gears journalled in said first frame, gears carried by said intermediate and output shafts, a cross shaft journalled in said second frame, gears carried by said cross shaft and meshing with the gears of said intermediate and output shafts, and means for selectively rotating one of said input and output frames at the speed of said power input shaft or at a speed equal to or below the speed thereof.

9. In a variable speed power transmission, three aligned shafts comprising a power input shaft, an intermediate shaft and a power output shaft, a main frame relative to which said shafts are journalled, a first frame carried by said intermediate shaft, a second frame rotatable on said intermediate shaft, and gearing connections between said input, intermediate, and output shafts including planetary gears journalled in said first frame, a gear on said input shaft meshing therewith, a gear on said second frame and also meshing therewith, a pair of gears journalled in said second frame, a gear on said intermediate shaft meshing with one of said pair of gears, a gear on said output shaft meshing with the other of said pair of gears, and means for controlling the rotation of one of said first and second frames.

10. In a variable speed power transmission, three aligned shafts comprising a power input shaft, an intermediate shaft and a power output shaft, a main frame relative to which said shafts are journalled, a first frame carried by said intermediate shaft, a second frame rotatable on said intermediate shaft, and gearing connections between said input, intermediate, and output shafts including planetary gears journalled in said first frame, a gear on said input shaft meshing therewith, a gear on said second frame and also meshing therewith, a pair of gears journalled in said second frame, a gear on said intermediate shaft meshing with one of said pair of gears, a gear on said output shaft meshing with the other of said pair of gears, and means for rotating one of said first and second frames to vary the speed of said power output shaft relative to the speed of said power input shaft.

11. A power transmission having a double gear train arrangement including an input shaft, an output shaft and an intermediate shaft between said input shaft and said output shaft, a stationary main frame for journalling said shafts, a pair of movable secondary frames, one secured to said intermediate shaft and the other journalled relative thereto, a cross shaft journalled in said other secondary frame, and operative connections between said input shaft and said output shaft comprising a gear on the input shaft, a planetary gear journalled in said first secondary frame and meshing with the gear of said input shaft, a gear carried by said second secondary frame and meshing with said planetary gear, a gear on said intermediate shaft, a gear on said output shaft, planetary gears meshing with said last two gears and mounted on said cross shaft, and means to vary the speed of said secondary frames to variably relate the speed of the output shaft to the speed of the input shaft.

12. A power transmission having a double gear train arrangement including an input shaft, an output shaft and an intermediate shaft between said input shaft and said output shaft, a stationary main frame for journalling said shafts, a pair of movable secondary frames, one secured to said intermediate shaft and the other journalled relative thereto, a cross shaft journalled in said other secondary frame, and operative connections between said input shaft and said output shaft comprising a gear on the input shaft, a planetary gear journalled in said first secondary frame and meshing with the gear of said input shaft, a gear carried by said second secondary frame and meshing with said planetary gear, a gear on said intermediate shaft, and a gear on said output shaft, planetary gears meshing with said last two gears and mounted on said cross shaft, said output shaft rotating at the speed of said input shaft when said secondary frames rotate at the speed of said intermediate shaft.

13. A power transmission having a double gear train arrangement including an input shaft, an output shaft and an intermediate shaft between said input shaft and said output shaft, a stationary main frame for journalling said shafts, a pair of secondary frames, one secured to said intermediate shaft and the other journalled relative thereto, a cross shaft journalled in said other secondary frame, one gearing connection between said input shaft and said intermediate shaft comprising planetary gears carried by said first secondary frame, a gear on said input shaft meshing therewith, a gear on said second frame also meshing therewith, a second gearing connection between said intermediate shaft and said output shaft comprising a cross shaft journalled in said second secondary frame, planetary gears carried thereby and rotatable therewith, and gears on said intermediate and said output shafts meshing with said last planetary gears, said entire transmission rotating as a unit when said secondary frames are rotated at the same speed as said input shaft.

14. A power transmission having a double gear train arrangement including an input shaft, an output shaft and an intermediate shaft between said input shaft and said output shaft, a stationary main frame for journalling said shafts, a pair of secondary frames, one secured to said intermediate shaft and the other journalled relative thereto, a cross shaft journalled in said other secondary frame, one gearing connection between said input shaft and said intermediate shaft comprising planetary gears carried by said first secondary frame, a gear on said input shaft meshing therewith, a gear on said second frame also meshing therewith, a second gearing connection between said intermediate shaft and said output shaft comprising a cross shaft journalled in said second secondary frame, planetary gears carried thereby and rotatable therewith, gears on said intermediate and said output shafts meshing with said last planetary gears, said entire transmission rotating as a unit when said frames are rotated at the same speed as said input shaft, and means to vary the speed of one of said secondary frames to variably relate the speed of the output shaft to the speed of the input shaft.

15. In a power transmission of the character disclosed, an input shaft, an output shaft, a main frame for journalling said shafts, input and output trains of gears, an input frame, an output frame, and an intermediate shaft, said gears, frames and intermediate shaft operatively connecting the respective input and output shafts together, said input train comprising a gear on the input shaft, a second gear journalled in the input frame and meshing with said first gear and a third gear rotating with said second gear, a fourth gear meshing with said third gear and carried by said output frame, said output train comprising a fifth gear secured to said intermediate shaft, a sixth gear meshing therewith and journalled in said output frame, a seventh gear rotatable with said sixth gear and an eighth gear on said output shaft and meshing with said seventh gear, an adjustable speed drive for driving either of said input and output frames and thereby changing the speed of the output shaft relative to the speed of the input shaft, and a three-positional geared drive for rotating said input and output frames in unison or for locking either frame against rotation and permitting free rotation of the other frame or for permitting free rotation of both frames when said adjustable speed drive is in operation, said adjustable speed drive having a neutral position for declutching the drive with respect to both said secondary frames when said three-positional geared drive is in operation.

16. In a power transmission of the character disclosed, an input shaft, an output shaft, a main frame for journalling said shafts, input and output trains of gears, a secondary input frame, a secondary output frame, and an intermediate shaft, said gears, frames and intermediate shaft operatively connecting the respective input and output shafts together, said input train comprising a gear on the input shaft, a second gear journalled in the secondary input frame and meshing with said first gear and a third gear rotating with said second gear, a fourth gear meshing with said third gear and carried by said secondary output frame, said output train comprising a fifth gear secured to said intermediate shaft, a sixth gear meshing therewith and journalled in said secondary output frame, a seventh gear rotatable with said sixth gear and an eighth gear on said output shaft and meshing with said seventh gear, an adjustable speed drive for driving either of said secondary frames and thereby changing the speed of the output shaft relative to the speed of the input shaft, and a three-positional geared drive for rotating said secondary frames in unison or for locking either frame against rotation and permitting free rotation of the other frame.

17. In a positive drive variable speed power transmission, an input shaft, an output shaft, a stationary main frame for journalling said shafts, an intermediate shaft, a first frame rotatable therewith and rotatable relative to said main frame, a second frame rotatable on said intermediate shaft, gears journalled in said first frame, a gear on said input shaft meshing therewith, a gear on said first frame also meshing therewith, a cross-shaft journalled in said second frame, gears carried by said cross-shaft, a gear on said intermediate shaft and a gear on said output shaft meshing with said gears on said cross shaft, and means for relatively rotating said first and second frames, said last means comprising an adjustable speed drive for driving either of said frames and thereby changing the speed of the output shaft relative to the speed of the input shaft.

18. In a positive drive variable speed power transmission, an input shaft, an output shaft, a stationary main frame for journalling said shafts, an intermediate shaft, a first frame rotatable therewith and rotatable relative to said main frame, a second frame rotatable on said intermediate shaft, gears journalled in said first frame, a gear on said input shaft meshing therewith, a gear on said first frame also meshing therewith, a cross-shaft journalled in said second frame, gears carried by said cross-shaft, a gear on said intermediate shaft and a gear on said output shaft meshing with said gears on said cross shaft, and means for relatively rotating said first and second frames, said last means comprising a three-positional geared drive between said first and second frames.

19. In a positive drive variable speed power transmission, an input shaft, an output shaft, a stationary main frame for journalling said shafts, an intermediate shaft, a first frame rotatable therewith and rotatable relative to said main frame, a second frame rotatable on said intermediate shaft, gears journalled in said first frame, a gear on said input shaft meshing therewith, a gear on said first frame also meshing therewith, a cross-shaft journalled in said second frame, gears carried by said cross-shaft, a gear on said intermediate shaft and a gear on said output shaft meshing with said gears on said cross shaft, and means for relatively rotating said first and second frames comprising a three-positional drive geared to each of said first and second frames and operable to rotate them in unison or to lock either frame against rotation while permitting free rotation of the other frame.

20. In a power transmission of the character disclosed, an input shaft, an output shaft, a main frame for journalling said shafts, input and output trains of gears, an input frame, an output frame, and an intermediate shaft, said gears, frames and intermediate shaft operatively connecting the respective input and output shafts together, said input train comprising a gear on the input shaft, a second gear journalled in the input frame and meshing with said first gear and a third gear rotating with said second gear, a fourth gear meshing with said third gear and carried by said output frame, said output train comprising a fifth gear secured to said intermediate shaft, a sixth gear meshing therewith and journalled in said output frame, a seventh gear rotatable with said sixth gear and an eighth gear on said output shaft and meshing with said seventh gear, and a three-positional geared drive to rotate said input and output frames in unison or lock either frame against rotation and permit free rotation of the other frame.

21. In a power transmission of the character disclosed, a tubular input shaft, a tubular output shaft, a through shaft extending through both of said tubular shafts, a stationary main frame for journalling said shafts, and two trains of gears operatively connecting the tubular shafts together, one train of gears including a first frame, planetary gears journalled therein, said input shaft having a gear meshing therewith, said through shaft having a gear also meshing therewith, the other train of gears including a second frame rotatable with said through shaft, a cross-shaft rotatably carried by said second frame, planetary gears thereon, said first frame having a gear meshing with said last planetary gears and said output shaft having a gear also meshing therewith, and an adjustable drive for driving either said through shaft or said first frame and thereby changing the speed of the tubular output shaft relative to the speed of the tubular input shaft.

22. In a positive drive variable speed power transmission, a tubular input shaft, a tubular output shaft, a stationary frame for journalling said shafts, a through shaft rotatable in said tubular shaft, an intermediate sleeve rotatable on said through shaft, a frame rotatable therewith, planetary gears journalled in said frame, said input shaft having a gear meshing therewith, said through shaft having a gear also meshing therewith, a cross-shaft rotatably carried by said through shaft, planetary gears thereon, said intermediate sleeve having a gear meshing therewith and said tubular output shaft having a gear also meshing therewith, and means for rotating said through shaft at the speed of said input shaft, said last means being adjustable to decrease the speed of said through shaft relative to said input shaft.

23. In a positive drive power transmission, a tubular input shaft, a tubular output shaft, a through shaft journalled in said tubular shafts, a main frame in which said tubular shafts are journalled, a sleeve intermediate said tubular shafts and connections between said sleeve and said tubular shafts comprising a frame rotatable with said sleeve, a set of planetary gears journalled in said frame, said through shaft being rotatable with respect to said sleeve, a gear carried by said through shaft and meshing with said set of planetary gears, a gear on said tubular input shaft and also meshing with said set of planetary gears, a second set of planetary gears rotatably carried by said through shaft, gears on said intermediate sleeve and said tubular output shaft meshing with said second set of planetary gears, and means for selectively controlling the rotation of said intermediate sleeve or said through shaft.

DONALD L. MOUNT.

REFERENCES CITED

The following references are of record in the file of this patent:

UNITED STATES PATENTS

| Number | Name | Date |
| --- | --- | --- |
| 1,422,509 | Wheeler | July 11, 1922 |
| 1,696,837 | Christiansen et al. | Dec. 25, 1925 |
| 2,142,813 | Cory | Jan. 3, 1939 |
| 2,196,368 | Thomson | Apr. 9, 1940 |
| 2,221,186 | Grosch | Nov. 12, 1940 |